United States Patent [19]

Feldstein et al.

[11] Patent Number: 5,038,994
[45] Date of Patent: Aug. 13, 1991

[54] APPARATUS FOR EXPLOSIVELY WELDING A SLEEVE INTO A HEAT EXCHANGER TUBE

[75] Inventors: Joel G. Feldstein, Plain Township, Shark County; David E. Merker, Minerva, both of Ohio

[73] Assignee: The Babcock & Wilcox Company, New Orleans, La.

[21] Appl. No.: 338,463

[22] Filed: Apr. 14, 1989

Related U.S. Application Data

[63] Continuation of Ser. No. 108,386, Oct. 13, 1987, abandoned.

[51] Int. Cl.$^5$ .............................................. B23K 20/08
[52] U.S. Cl. ................................... 228/2.5; 29/402.16; 29/421.2; 29/890.031
[58] Field of Search ................... 29/157.3 R, 157.3 C, 29/421.1, 421.2, 402.09, 402.16, 507, 522.1, 523, 726; 228/2.5, 107, 108, 109

[56] References Cited

U.S. PATENT DOCUMENTS

| | | | |
|---|---|---|---|
| 3,411,198 | 11/1968 | Berman et al. | 29/421.1 |
| 3,562,887 | 2/1971 | Schroeder et al. | 29/421.1 X |
| 3,590,877 | 7/1971 | Leopold | 29/421.1 X |
| 3,774,291 | 11/1973 | Snyder et al. | 228/107 |
| 3,781,966 | 1/1974 | Lieberman . | |
| 3,790,060 | 2/1974 | Feiss | 228/2.5 |
| 3,868,131 | 2/1975 | Zondag | 228/107 X |
| 3,912,148 | 10/1975 | Johnson | 29/157.3 R X |
| 4,003,513 | 1/1977 | Chadwick | 228/107 |
| 4,021,407 | 5/1977 | Zondag | 228/107 X |
| 4,567,632 | 2/1986 | Peters et al. | 29/402.09 X |
| 4,587,904 | 5/1986 | Berman et al. | 228/107 X |
| 4,765,527 | 8/1988 | Berman | 228/107 |

FOREIGN PATENT DOCUMENTS

| | | | |
|---|---|---|---|
| 0043672 | 1/1982 | European Pat. Off. . | |
| 0265284 | 4/1988 | European Pat. Off. . | |
| 2195769 | 3/1974 | France . | |
| 58-55183 | 4/1983 | Japan . | |
| 8706169 | 10/1987 | PCT Int'l Appl. . | |
| 1220582 | 1/1971 | United Kingdom | 29/507 |
| 1280451 | 7/1972 | United Kingdom . | |
| 1439141 | 6/1976 | United Kingdom . | |
| 1584451 | 2/1981 | United Kingdom . | |

Primary Examiner—Timothy V. Eley
Assistant Examiner—Peter Dungba Vo
Attorney, Agent, or Firm—Robert J. Edwards; Vytas R. Matas; Eric Marich

[57] ABSTRACT

A sleeve containing an explosive charge which is explosively welded along a tapered end to the inner surface of a tube for repairing a damaged section of the tube. No mechanical support is needed along the outer surface of the tube despite the explosive expansion and welding of the sleeve. The explosive charge is tapered at the end of the sleeve. A charge assembly for carrying the explosive charge includes a flange for centering the sleeve in the tube and for establishing a stand-off distance between the sleeve and the tube.

15 Claims, 4 Drawing Sheets

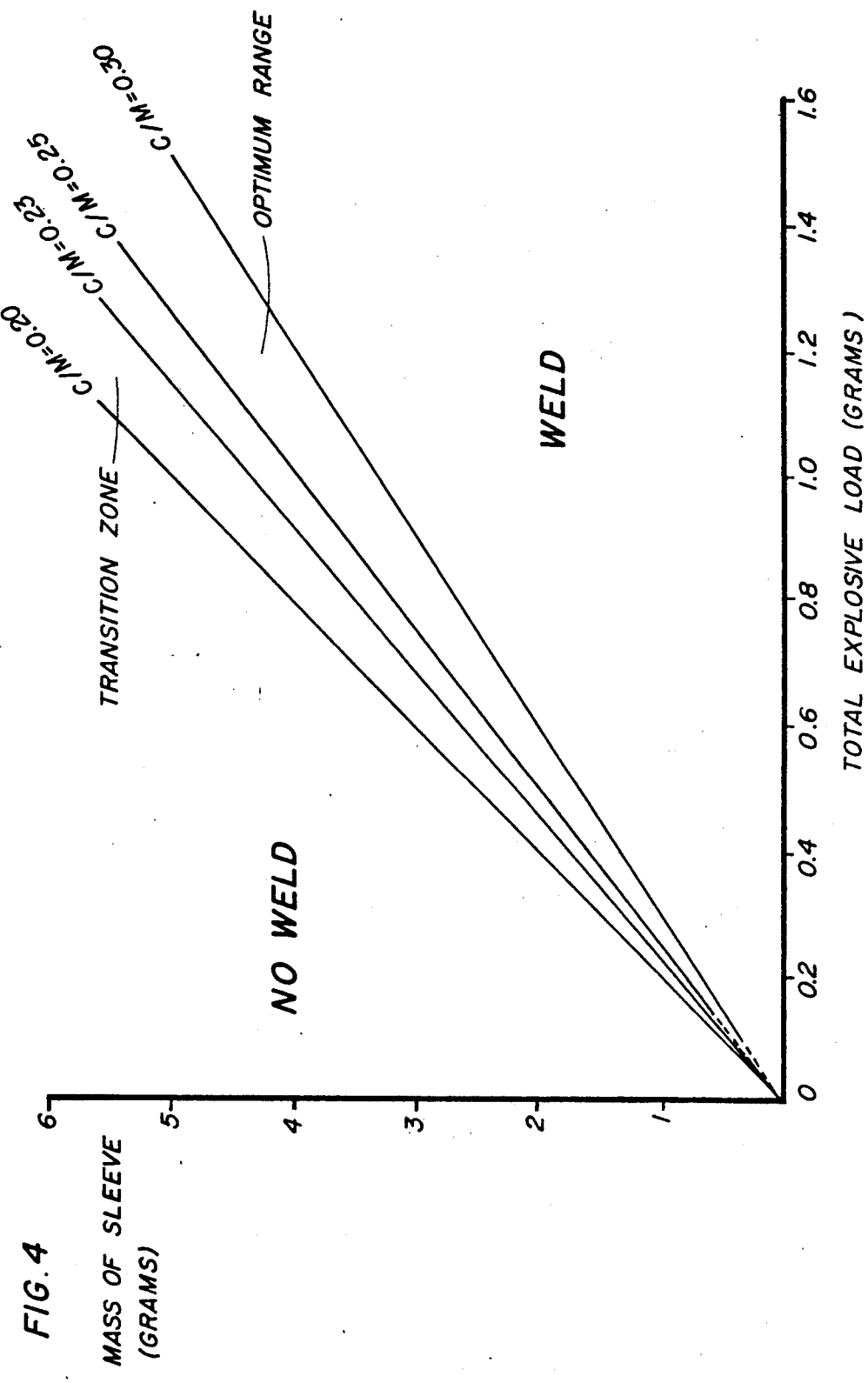

APPARATUS FOR EXPLOSIVELY WELDING A SLEEVE INTO A HEAT EXCHANGER TUBE

BACKGROUND OF THE INVENTION

This is a continuation of application Ser. No. 108,386, filed Oct. 13, 1987, now abandoned.

The present invention relates to the installation of sleeves in heat exchanger tubes for the purpose of repairing the heat exchanger tubes and, more particularly, to a new and useful method of explosively welding a sleeve into a heat exchanger tube at a location spaced away from a tubesheet or tube support plate that supports the heat exchanger tube.

Many heat exchangers, such as nuclear steam generators, employing tubes arranged in bundles by tube support plates and tubesheets, experience corrosive or mechanical damage in the vicinity of these structures which require repair. One method of making such a repair involves placing an internal sleeve inside the damaged tube at the location of the defect and with a length sufficient to extend beyond the defect. As a result, the sleeve often must extend beyond the supporting portions of the tubesheet or tube support plate. Further, to hold the sleeve in place and to prevent leakage around the sleeve, the sleeve must be sealed to the inner surface of the tube. Present methods of sealing the sleeve include expansion of the sleeve into the tube wall, brazing the sleeve to the tube wall, or explosive welding. The last mentioned technique, however, generally requires some sort of external support to prevent excessive deformation of the tube.

Explosive expansion or welding of tubes in heat exchangers for either installation or repair is well known in the art. For example, U.S. Pat. No. 3,411,198, discloses a plastic insert comprised of an explosive charge placed within an annular tubular force transmitting member made of polyethylene, having an air gap at one end thereof, for expanding a tube into a tubesheet.

U.S. Pat. No. 3,590,877 discloses an explosive activated metal cylindrical plug used to plug a defective heat exchanger tube in the vicinity of the externally supporting tubesheet. In this patent, shaped explosive charges are formed by wrapping sheets of the explosive around frustoconical and cylindrical styrofoam filler pieces, separated by a central cylindrical block of explosive.

U.S. Pat. No. 3,724,062 also discloses an explosive plug for a heat exchanger tube in the vicinity of a tubesheet. The plug has a central cylindrical section and end frustoconical sections with the explosive charge being cylindrically shaped and located in the central cylindrical section.

U.S. Pat. No. 3,790,060 discloses the use of a pair of explosive members, one of which serves to weld a pipe to the perforated plate through which it passes, while the second expands the pipe into bearing contact with the plate at flared or counterboard portions located at the faces of the perforated plate.

U.S. Pat. No. 3,912,148 discloses a combination welding and brazing device for repairing heat exchanger leaks at the junctions between the tubing and the associated tubesheets. A number of grooves filled with brazing metal are located on one end of the metal sleeve. The other end has a reduced thickness and accomodates a relatively large charge of nitroguanidine. A smaller expansion charge of PETN extends from the nitroguanidine through the center of the sleeve and past the grooves. When detonated, the thin portion of the sleeve (which is inserted into the tube sheet portion of the tube) is welded to the inner surface of the tube, while the other end that lies within the free-standing end is merely pressed into closer brazing contact with the tube inner surface. The actual brazing itself is accomplished in a second step by means of a cartridge type electrical resistance heater that is inserted into the sleeve/tube to heat and liquefy the brazing metal.

U.S. Pat. No. 3,912,148, which is assigned to the assignee of the present invention is of particular interest, however, in its description of the prior art existing at the time. The Patent indicates that explosive welding is suitable for use within the tubesheet and brazing is suitable for use within the free-standing portion of the tube bank, due to concerns of excessive tube deformation. The explosion used in the free-standing portion is used only to expand the brazing portion of the sleeve into close contact with the tube inner wall, not to accomplish the joining itself.

U.S. Pat. No. 4,028,789 also discloses a combination welding/brazing process, quite similar to U.S. Pat. No. 3,912,148, where the welding is done within the tubesheet supported portion of the tube and expansion is done in the free-standing portion of the tube.

U.S. Pat. No. 4,021,907 discloses an explosive plug for sealing a defective tube held in a heat exchanger tubesheet. Each end of the plug has a hollow cylindrical or frustoconical end filled with a similarly shaped explosive charge. The various embodiments of this patent show the use of a detonator on one end and a percussion pin on the other so that both charges are detonated almost simultaneously.

U.S. Pat. No. 4,513,903 discloses yet another sleeving apparatus and method for sleeving a defective tube within a tubesheet, where the sleeve is welded directly over the defective portion of the tube. U.S. Pat. No. 4,567,632, while disclosing an explosive method of repairing defective tubes outside of the tubesheet, employs an external support comprised of a low melting point alloy cast around the free-standing portions of the tubes. U.S. Pat. No. 4,587,904 discloses a debris free plug assembly for repairing a tube within a tubesheet.

In general, the aforementioned patents teach the explosive welding of a sleeve into a tube in an area surrounded by the tubesheet or tube support plates. Where an explosive charge is used to expand a sleeve or plug inside a heat exchanger tube, at a location which is not immediately within the tubesheet or tube support plate, explosive welding is not utilized. None of the noted patents disclose or suggest the possibility of explosively welding a sleeve having tapered ends, into the interior of a heat exchanger tube, at a location which is not mechanically supported from the outside.

SUMMARY OF THE INVENTION

In accordance with the invention an apparatus and method are provided for explosively welding a sleeve within a tube without the use of a removable external support such as a removable die or a fixed external support such as a tubesheet. A sleeve which is inserted into a heat exchanger tube and which spans a damaged area of the tube, according to the invention, has tapered ends that can be explosively expanded and welded to the heat exchanger tube without the need for any exterior mechanical support for the heat exchanger tube. The tapered ends have a reduced welding mass which permits the use of decreased explosive loading and improves welding performance.

In the inventive arrangement and technique, an explosive charge is contained in a plastic assembly. The plastic assembly includes a cup which holds the explosive and which is received within a tapered end of the sleeve. A flange of the plastic assembly engages against the interior of the tube to be repaired for centering the assembly in the tube. The cup includes a tapered center portion which shapes the explosive charge for optimum performance. A closure cap at the opposite end of the plastic assembly carries a detonator. The cap is shaped so that, upon detonation of the detonator, forces are not transmitted to the sleeve or tube. In this way, neither the sleeve nor the tube is deformed by the action of the detonator. The cap also serves to form a watertight seal for the explosive charge.

Accordingly, an object of the present invention is to provide a method of explosively welding a sleeve into a tube, providing the sleeve with a tapered end to be welded to the tube, positioning the sleeve in the tube at a location which is free of external mechanical support for the tube, positioning an explosive charge in the sleeve adjacent to its tapered end and detonating the explosive charge to expand the end of the sleeve and weld it to the tube.

A further object of the present invention is to provide an apparatus for repairing a damaged section of tube comprising a sleeve for insertion into the tube and for spanning the damaged section, the sleeve having at least one tapered end, an explosive charge assembly in the sleeve adjacent its tapered end and means forming a part of the assembly for centering the tapered end of the sleeve in the tube, the explosive charge assembly carrying a shaped charge of explosive material which decreases in amount in the direction of taper of the tapered end of the sleeve to the end of the sleeve.

A still further object of the present invention is to provide an apparatus for explosively welding a sleeve to the interior of the tube which can be used at a location spaced from any exterior mechanical support for the tube.

BRIEF DESCRIPTION OF THE DRAWINGS

In the accompanying drawings, forming a part of this specification, and in which reference numerals shown in the drawings designate like or corresponding parts throughout the same.

FIG. 4 is a graph relating the mass of a sleeve to the total weight of an explosive charge for expanding the sleeve and the conditions required for welding the sleeve to the interior of a tube.

DETAILED DESCRIPTION

Figure 1:
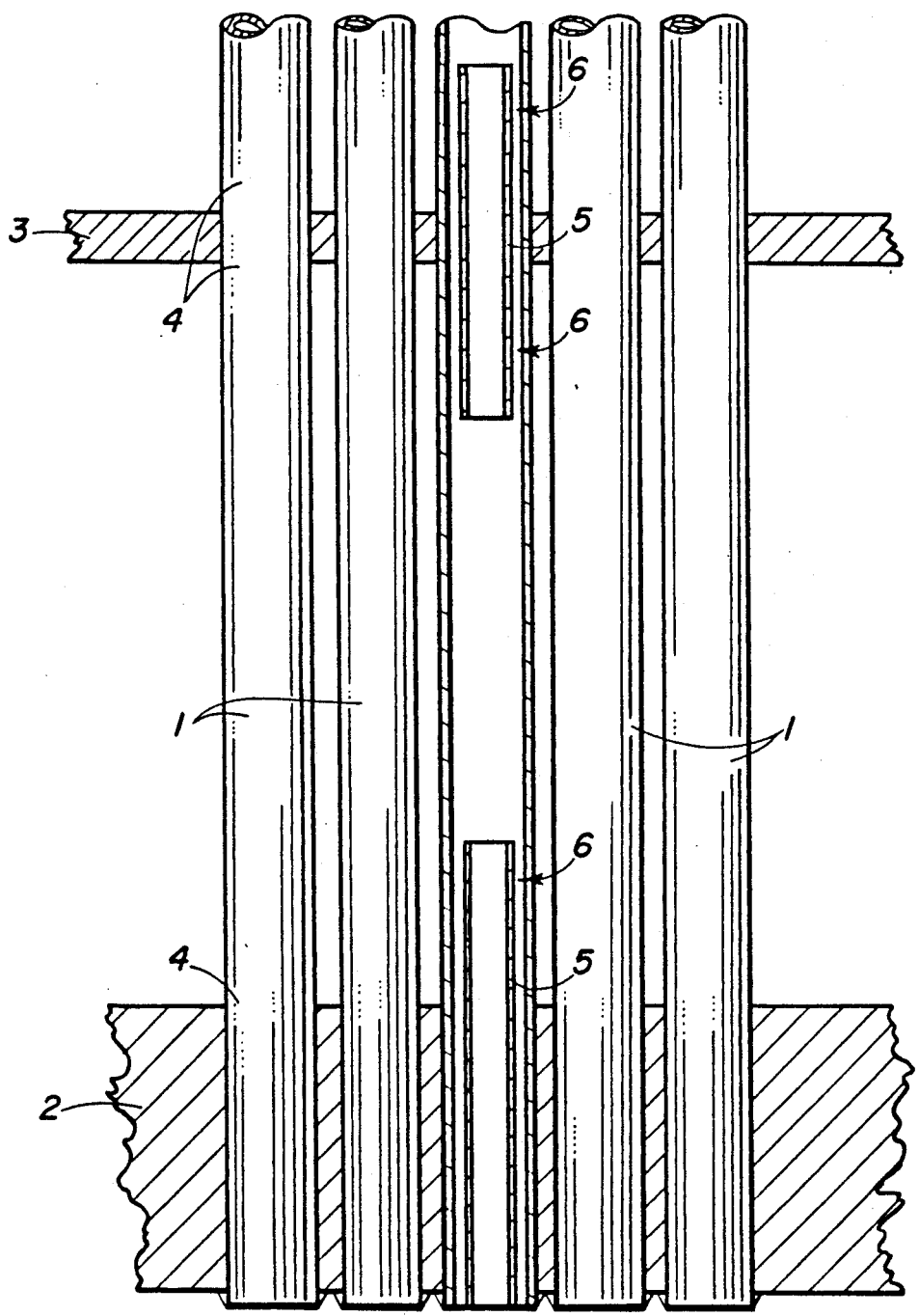
FIG. 1 is an elevation, partly in section, showing a plurality of tubes supported between a tubesheet and a tube plate, with one of the tubes containing sleeves for repairing damaged sections of that tube.
Figure 2:
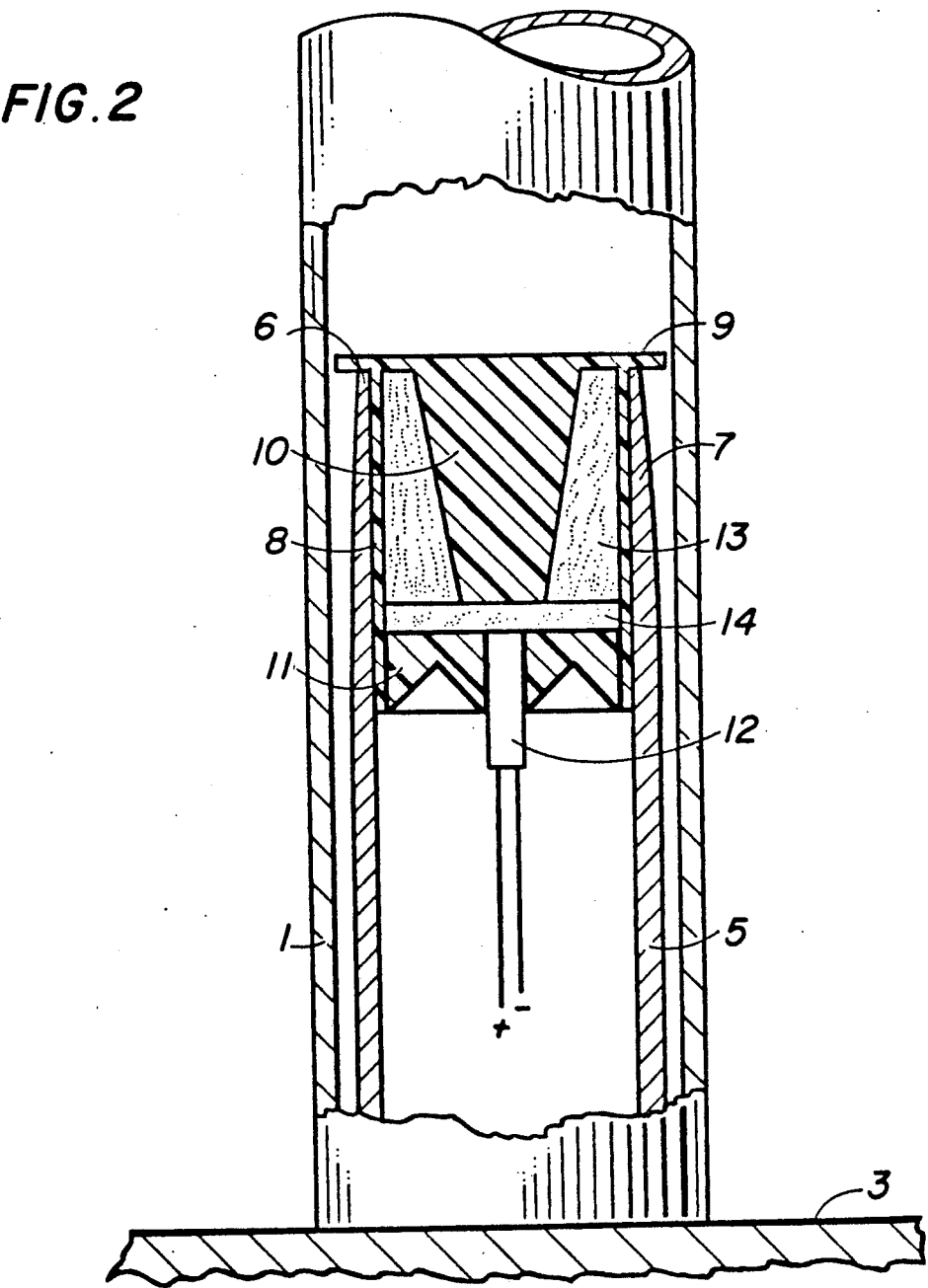
FIG. 2 is an enlarged, partial sectional view illustrating the area of one end of the sleeve inside a tube to be repaired, containing an explosive device for welding the end of the sleeve.

Referring now to the FIGS. 1 and 2 in particular, a sleeve 5 having a constant internal diameter and tapering outside diameter 7 at least at one of its opposite ends 6, is used to bridge a damaged area 4 in a tube 1. The taper reduces the welding mass, as described hereafter, thereby allowing use of a reduced explosive charge 13, 14 while improving the welding performance.

The main explosive preferably comprises an explosive charge 13 of nitroguanidine, a booster charge 14 of PETN (pentaerythritol tetranitrate) and a bridge wire detonator 12. The explosive components are contained in an acrylic plastic assembly that serves several functions. The main part of the assembly is a generally cylindrical cup 8 that has a flange 9 on one end to center the charge and provide a predetermined stand-off, as defined hereafter, between the outer surface of the sleeve 5 and the inner surface of tube 1. A tapered frustoconical center portion 10 of the cup 8, which tapers with increasing cross-sectional area toward the flange 9 of the cup 8 (i.e., toward the end 6 of the sleeve 5), reduces the amount of explosive charge 13 used and shapes it to achieve optimum welding performance. A closure cap 11 on the opposite end of the cup 8 contains the detonator 12, seals the assembly from water, and is designed with a circular outward facing, V-shaped groove to reduce deformation of the sleeve 5 when the detonator 12 is initiated so that the force is not transmitted to the sleeve 5 and tube 1, thereby reducing deformation. The assembly 8, 9, 10, 11 is advantageously composed of acrylic plastic.

Figure 3:
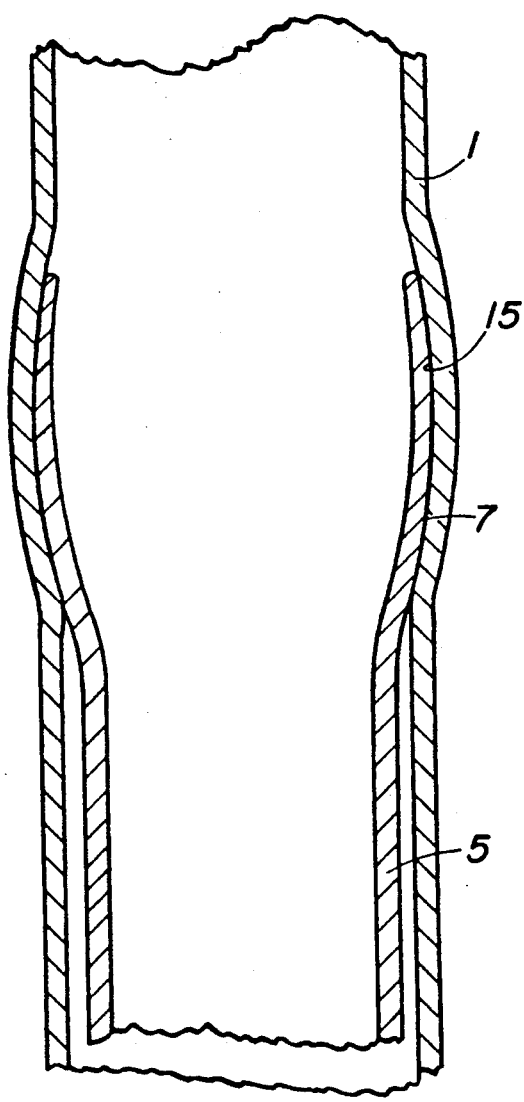
FIG. 3 is a sectional view showing the end of a sleeve after it has been explosively welded to the interior of a tube.
Figure 3:
Figure 3:
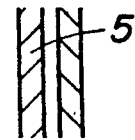

As shown in FIG. 3, after the explosive charge assembly has been detonated, the tapered end of sleeve 5 is expanded and explosively welded at 15, to the inner surface. This is accomplished without the aid of an exterior mechanical support, that is, at a location which is spaced away from any tubesheet or tube plate. The resulting deformation or bulge at weld 15 is minimal, approximately 12% increase in tube outside diameter.

The bulge can even be reduced by about 30% by simply providing water on the outside of the tube. Other aqueous environments, such as ice or aqueous solution could also be utilized. This is easily done, particularly under the environment of a heat exchanger where water can easily be added over the tubesheet or tube support plate during the explosive welding process, and then removed without any detrimental effects whatsoever.

By observing certain parameters it is possible to explosively weld the tapered end of the sleeve to the interior of the tube without rupturing the tube, even where the weld is made at the location spaced away from any external mechanical support such as a tubesheet or plate.

As used herein, the term stand-off is defined as the distance the sleeve needs to travel before it impacts the tube. The stand-off is advantageously one half to two times the sleeve wall thickness. In the tubular configuration of the present invention, the stand-off is the annular space between the sleeve and the tube. The stand-off must be large enough to allow the sleeve to achieve sufficient velocity so that the impact pressure will be large enough to produce a weld. It has also been found that the mass of the sleeve must be less than that of the tube. In the case of a fixed tubular configuration, this relates to sleeve wall thickness. According to the present invention, to produce acceptable welds, the sleeve wall thickness must be less than about 75% of the tube wall thickness.

As noted above, it is also important that the end of the sleeve to be welded is tapered. Tapers from 1° to 5.7° have been successfully tested. The best results occurred, however, with a tapered angle from 3° to 4.5°. Tapering the sleeve has several advantages. The first is that the taper helps reduce the mass of the sleeve that is being welded. This helps reduce the amount of explosive required to weld the sleeve, and hence, results in less deformation. Second, the taper helps increase the collision angle between the flyer and the base material. The collision angle is important for the formation of the explosive jet which removes surface oxides, and for the resulting wavy explosive weld interface caused by plastic flow of material during the collision. Finally, tapering the sleeve will produce a continuously increasing stand-off which will promote better welding conditions.

It is also important to select the appropriate amount of explosive charge.

The amount of explosive required is directly proportional to the amount of flyer that is being propelled to make the weld. Therefore, the amount (total weight) of explosive (C) is proportional to the mass (M) of the sleeve for a given explosive length and is expressed in a ratio C/M. This ratio is obtained by dividing the total weight of the explosive by the weight of the sleeve for that length.

For nitroguanidine, loaded to various densities for producing the explosive welds of the present invention, densities which produce the best results were 0.45 to 0.55 grams/cm$^3$. The total explosive weight also included a PETN booster charge whose amount and position were quite important for weld initiation and resulting weld quality. The total explosive weight per sleeve weight ratio which produced the best results were 0.25 to 0.29 C/M. By shaping the charge, using the tapered conical center portion of the plastic assembly, the appropriate C/M ratio was maintained, although this ratio was not constant throughout the explosive length. An overall range of 0.2 to 0.7 C/M can be used in accordance with the present invention to obtain acceptable welds.

It was also found that Inconel (registered trademark of International Nickel) Alloy 600 sleeves could be welded into Inconel 600 tubes where the sleeve thickness was from 0.030-inch to 0.040-inch and the tube had dimensions of 0.775-inch inner diameter and 0.875-inch outer diameter. The explosive resulted in a bulge having a 1-inch outer diameter. Where water was used on the outside of the tube, the bulge was reduced by about 30% to a final outer diameter of approximately 0.960-inch. The weld length was typically 0.25-inch.

The technique of the present invention provides an advantageous alternative to the formerly utilized time-consuming brazing operation which can be replaced by the inventive explosive welding. Brazing generally is slow and complicated and requires large amounts of equipment. The use of explosive allows the majority of work to be performed away from the location where the sleeves are to be installed. This is particularly advantageous in areas of high radiation in nuclear heat exchangers, as it reduces the amount of radiation to which personnel would otherwise be exposed.

The invention claimed is:

1. An apparatus for repairing a damaged section of a tube, comprising:
    a sleeve adapted to be positioned in the tube for spanning the damaged section, said sleeve having an end and an outside diameter that tapers toward said end and inwardly from an inside diameter of the tube at an angle of from 1° to 5.7°;
    an explosive charge holding assembly in said end portion of said sleeve having a centering flange adapted for engaging the inside diameter of the tube for centering said end portion of said sleeve in the tube; and
    an amount of explosive charge held by said assembly in said end portion of said sleeve for expanding and explosively welding said end portion of said sleeve to the interior of the tube, wherein the amount of explosive charge is designated C and is proportional to a mass M of said sleeve for a given explosive length, such that a ratio C/M lies within an overall range of 0.2 to 0.7.

2. An apparatus according to claim 1, wherein said angle is from 3° to 4.7°.

3. An apparatus according to claim 1, wherein said centering flange has a size to establish a stand-off distance between said sleeve and said interior of a tube containing said sleeve of from one half to two times the thickness of the sleeve wall.

4. An apparatus according to claim 1, wherein the ratio C/M lies within a range of 0.25 to 0.29.

5. An apparatus according to claim 1, wherein said assembly includes a cup for containing said explosive charge and positioned in said end portion of said sleeve, and a frustoconical center portion extending into said explosive charge and shaping said explosive charge so that it tapers and reduces in amount along said end portion to said end of said sleeve.

6. An apparatus according to claim 5, wherein said centering flange is fixed to said cup and said frustoconical portion.

7. An apparatus according to claim 5, including a cap in said cup covering said explosive charge, a detonator for said explosive charge held in said cap, said cap having a groove therein for avoiding transmission of forces from said detonator when said detonator is detonated, to said sleeve.

8. An apparatus according to claim 7, including a booster charge between said detonator and said explosive charge.

9. An apparatus according to claim 7, wherein said sleeve has a wall thickness from 0.03-inch to 0.04-inch.

10. An apparatus according to claim 9, wherein both the sleeve and the tube are made of INCONEL Alloy 600.

11. An explosive welding apparatus for a tube, comprising:
    a sleeve adapted to be positioned in the tube, said sleeve having an outer surface at an end portion with an inwardly tapering outside diameter tapering to said end of said sleeve;
    an amount of explosive charge for expanding and explosively welding said end portion of said sleeve to the interior of the tube;
    an explosive charge holding assembly in said end portion of said sleeve, having a cup positioned in said end portion of said sleeve for containing said explosive charge, and a frustoconical center portion extending into said explosive charge and having said explosive charge so that it tapers and reduces in amount along said end portion to said end of said sleeve; and
    a centering flange, fixed to said cup and said frustoconical center portion, for engaging an inside diameter of the tube to center said end portion of said sleeve in the tube.

12. An explosive charge holding assembly for welding a sleeve to an interior of a tube, comprising:
a cup for containing said explosive charge, adapted to be positioned in an end portion of said sleeve, having a centering flange at a first end adapted for engaging an inside diameter of the tube for centering said end portion of said sleeve in the tube, and a frustoconical center portion for extending into said explosive charge for shaping said explosive charge so that it tapers and reduces in amount along said end portion to said end of said sleeve, said centering flange being fixed to said cup and said frustoconical portion; and a closure cap, located on an opposite end of said cup, adapted for containing a detonator and sealing the assembly and having a circular, outward facing groove for reducing deformation of the sleeve when the detonator is initiated.

13. An apparatus according to claim 12, wherein said explosive charge comprises an explosive charge of nitroguanidine, and a booster charge of PETN.

14. An apparatus according to claim 12, wherein the circular, outward facing groove is V-shaped.

15. An apparatus according to claim 12, wherein said detonator is a bridge line detonator.

* * * * *